United States Patent
Gordon

(10) Patent No.: US 6,220,733 B1
(45) Date of Patent: Apr. 24, 2001

(54) VEHICLE WHEEL LIGHTING SYSTEM

(75) Inventor: Ryan Lee Gordon, 1097 SW. Ellis St., Dallas, OR (US) 97338

(73) Assignee: Ryan Lee Gordon, Dallas, OR (US)

( * ) Notice: Subject to any disclaimer, the term of this patent is extended or adjusted under 35 U.S.C. 154(b) by 0 days.

(21) Appl. No.: 09/062,362

(22) Filed: Apr. 17, 1998

Related U.S. Application Data

(60) Provisional application No. 60/044,634, filed on Apr. 18, 1997.

(51) Int. Cl.[7] ............................. F21V 8/00; F21W 101/02
(52) U.S. Cl. .......................... 362/500; 362/511; 362/545
(58) Field of Search ................................. 362/555, 500, 362/511, 543, 544, 545, 473

(56) References Cited

U.S. PATENT DOCUMENTS

| | | |
|---|---|---|
| 3,548,185 | 12/1970 | Hall . |
| 3,767,909 | 10/1973 | Bell . |
| 4,135,229 * | 1/1979 | Modurkay ............................. 362/473 |
| 4,381,537 * | 4/1983 | Hinrichs ................................. 362/78 |
| 4,430,692 * | 2/1984 | Papadakis ........................ 362/511 X |
| 4,562,516 * | 12/1985 | Chastain ................................ 362/500 |
| 4,763,230 | 8/1988 | Cummings et al. .............. 362/500 X |
| 5,121,305 | 6/1992 | Deed et al. ........................ 362/545 X |
| 5,278,732 * | 1/1994 | Frankum ................................ 362/473 |
| 5,363,085 | 11/1994 | Terada . |
| 5,418,697 * | 5/1995 | Chiou ..................................... 362/473 |
| 5,465,194 * | 11/1995 | Currie .............................. 362/500 X |
| 5,477,427 * | 12/1995 | Forman ................................. 362/473 |
| 5,497,302 * | 3/1996 | O'Donnell ............................ 362/500 |
| 5,530,630 | 6/1996 | Williams, Jr. ......................... 362/500 |
| 5,584,561 * | 12/1996 | Lahos ............................... 362/545 X |
| 5,584,562 * | 12/1996 | Geran ..................................... 362/473 |
| 5,624,175 * | 4/1997 | Gelormino et al. .................. 362/473 |
| 5,634,707 * | 6/1997 | Bailey, Jr. ............................. 362/500 |
| 5,803,574 * | 9/1998 | Szaniszlo ......................... 362/473 X |

FOREIGN PATENT DOCUMENTS

| | | | |
|---|---|---|---|
| 4138824 * | 5/1993 | (DE) ..................................... 362/500 |

* cited by examiner

Primary Examiner—Laura K. Tso
(74) Attorney, Agent, or Firm—Klarquist Sparkman Campbell Leigh & Whinston, LLP

(57) ABSTRACT

A light system for a vehicle wheel comprising at least one light source, at least one reflective body and an electrical power source operably coupled to the light source. The light source directs light toward the reflective body. In a preferred embodiment several spokes of a spoked wheel are replaced with reflective bodies, and a plurality of LEDs mounted in the inner hub of the spoked wheel direct light toward each reflective body spoke.

17 Claims, 5 Drawing Sheets

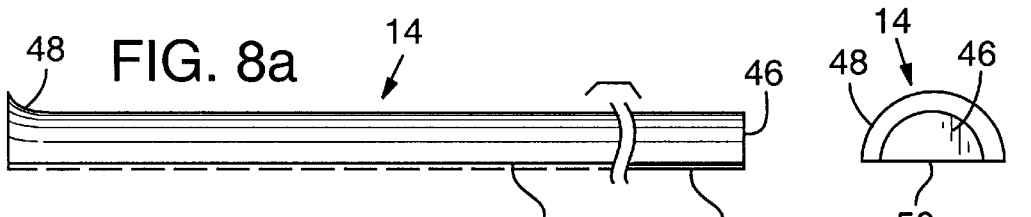
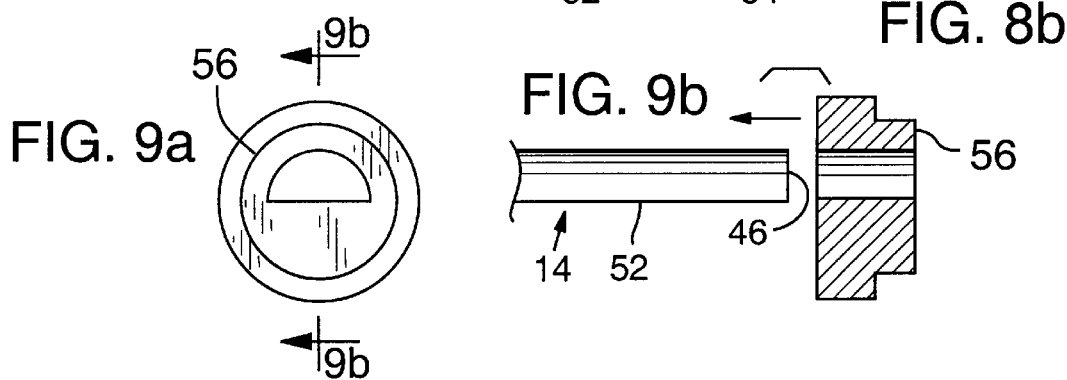
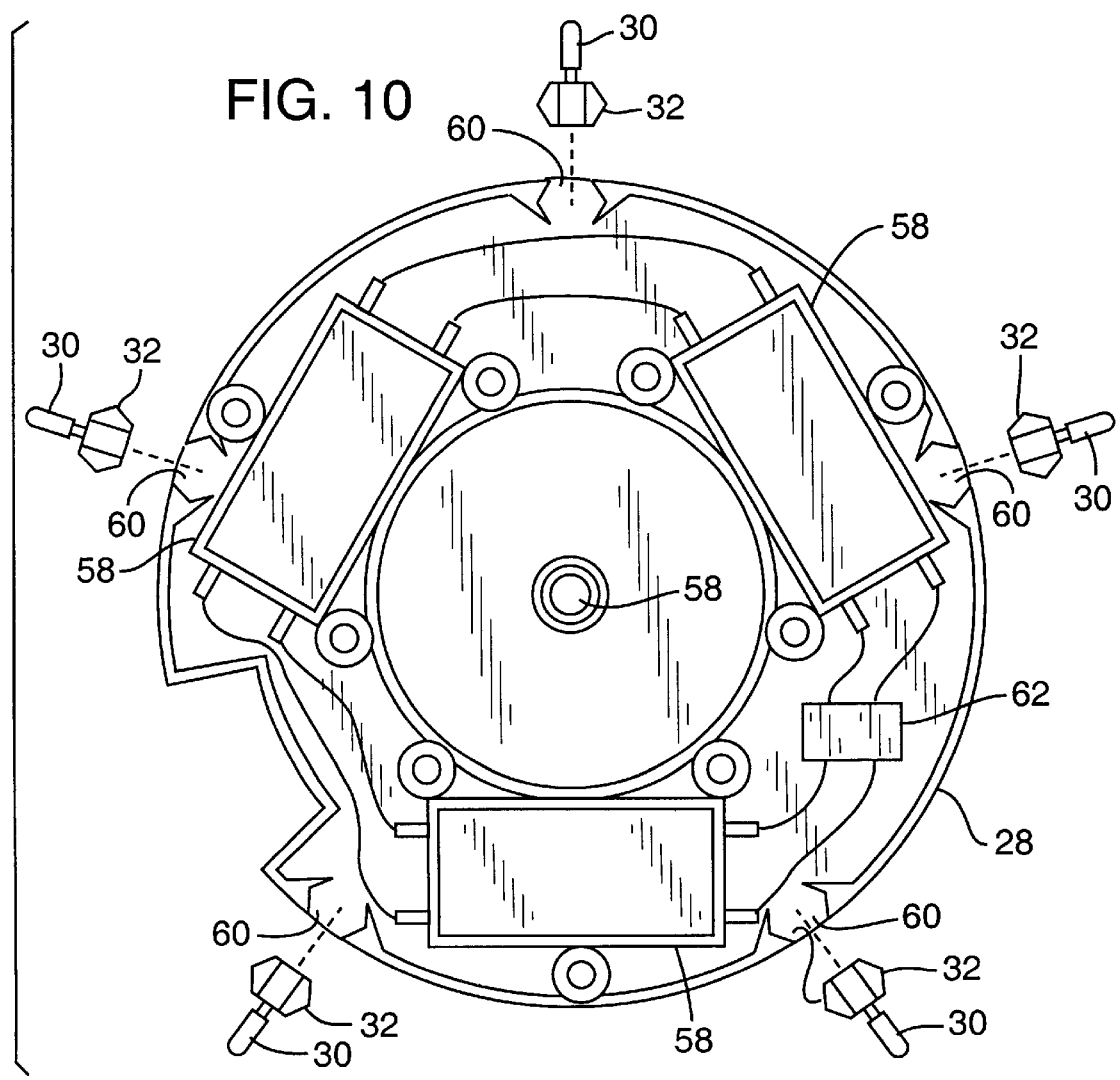

VEHICLE WHEEL LIGHTING SYSTEM

CROSS REFERENCE TO RELATED APPLICATION

This application claims priority from Gordon's U.S. provisional application No. 60/044,634, filed Apr. 18, 1997, which is incorporated herein by reference.

FIELD OF THE INVENTION

This invention concerns a light system for lighting a wheel on a vehicle, particulary automobiles.

BACKGROUND OF THE INVENTION

People have enjoyed automobiles for nearly a century, and many people feel that their automobile is an extension of their own personality. A primary factor for most people in considering which automobile to purchase is styling and aesthetics. The demand for improved styling has fueled the development of entire industries devoted to aftermarket automobile accessories.

Among the most common way to "accessorize" an automobile is to swap the wheels provided from the manufacture with "styled" wheels. The designs of these styled wheels include a variety of different forged and cast shapes, as well as the classic spoked wheel. Although there are many wheel choices available in today's market, no one has introduced a commercially successful system for lighting a wheel.

Moreover, ever since the introduction of the automobile there have been automobile accidents. Many accidents are caused when the driver of one vehicle fails to see the other vehicle due to restricted visibility caused by inclement weather or lighting conditions. This is particularly problematic at intersections where one auto approaches another from the side.

Auto manufacturers currently rely on passive reflectors to make vehicles more visible from the side. Typically, governmental regulations require that these reflectors be red or yellow. Reflectors merely reflect any light directed at them and do not actively project light. As a result, in the dark a vehicle having side reflectors goes undetected until the headlights of an approaching vehicle strikes the reflectors. In many instances, light may not strike the reflectors until it is too late to avoid a collision.

A proposed solution is to provide lights on the side of the vehicle. While some vehicles are provided with parking lights, this remedy is useless while the vehicle is in motion because the parking lights generally serve as turn-signal lights while the vehicle is driven.

Another proposed solution is to attach lights to the wheels of the vehicle. Several patents have issued concerning automobile wheels with lights. One such invention is disclosed in U.S. Pat. No. 4,763,230, which issued to Cummings and Rose on Aug. 9, 1988. The Cummings' et al. invention provides a plurality of light members in a string. The string of lights is interleafed between the spokes of a wheel. The string of lights is powered by a battery source.

U.S. Pat. No. 5,121,305 discloses a lighted wheel comprising a plurality of light emitting diodes connected in parallel and contained in a flexible, transparent tube. The light emitting diodes are powered by a battery power source preferably connected to the wheel. The apparatus is designed to be preferably used with spoked wheels. The primary purpose of this apparatus is for safety purposes and preferably is used with bicycle, scooters, etc.

U.S. Pat. No. 5,363,085 discloses a wheel marker for an automobile wheel. The wheel marker extends radially from the wheel hub, and comprises a light-emitting section that includes a light emitting-element such as an electroluminescence element or a light emitting diode. The light-emitting element is powered by a battery or solar cell, and can be automatically turned on and off using a brightness detecting sensor.

One problem with the wheel lights described above is that they lack aesthetic appeal. Many, if not most, car owners are particular about how their car looks. The foregoing lighted wheels may not have reached significant commercial success because they look like what the are: lights or lighted elements that are attached to wheels that were not designed to have lights applied to them.

SUMMARY OF THE INVENTION

According to one aspect of the invention, a lighting system for a vehicle wheel is provided comprising a light source, at least one reflective body, and a power source, particularly an electric power source, to power the light source. The light source and reflective body are operably coupled to a wheel so that the light source directs light toward a light-receiving end of the reflective body. The directed light is reflected within the reflective body, thereby illuminating the reflective body.

The reflective body preferably is made from a translucent or transparent material, such as a plastic or other polymeric material. Many features of the reflective body can be selected for individual preference, including the external shape, the hollow profile shape, the color, the material texture, etc.

In a working embodiment, the light source comprises multiple lights that are used to illuminate multiple reflective bodies. The lights preferably are light-emitting diodes, but also may be incandescent or fluorescent lights.

A preferred embodiment of the present invention replaces one or more spokes, preferably plural spokes, of a spoked wheel with reflective bodies. Commercially available spoked wheels are provided with removable spokes that connect an inner hub to an outer rim. At least one, and typically several, of the spokes are removed and replaced with reflective bodies that are suitably sized and shaped for replacing the removable spokes. The reflective bodies are situated so that a light-receiving end extends through the inner hub, and the opposite end extends through the outer rim. In a working embodiment the reflective body is secured in place using a cap. The reflective bodies typically include at least one flattened surface that runs substantially along the length of the bodies. A reflective tape also may, and typically is, applied to the flattened surface. Plural light-emitting diodes (LEDs) are circumferentially mounted to the inner hub so as to direct light toward the light-receiving ends of the reflective bodies, thereby illuminating them. The LEDs can be powered by batteries that are coupled to the wheel, such as by being mounted in the inner hub. The LEDs can be preferably activated by means of a remote-control switch, or optionally, by means of a manual switch.

One object of the present invention is to provide a lighting system for a vehicle wheel that is useful for safety purposes and is aesthetically pleasing.

Another object of this invention is to provide a lighted wheel that doesn't look like a wheel with added lights, but rather provides an appearance that the lights are integral with the wheel.

The foregoing and additional features and advantages of the invention will be more readily apparent from the following detailed description and accompanying drawings.

BRIEF DESCRIPTION OF THE DRAWINGS

FIG. 8a is an elevational view of a reflective body of the embodiment of FIG. 7.

FIG. 8b is an end view of a reflective body of the embodiment illustrated in FIG. 7.

FIG. 9a is a plan view of one embodiment of a device for securing the reflective body illustrated in FIGS. 8a and 8b to a vehicle wheel.

FIG. 9b is a sectional view of one embodiment of a device for securing the reflective body illustrated in FIGS. 8a and 8b to a vehicle wheel.

FIG. 10 shows a detailed plan-view of the main housing of the embodiment illustrated in FIG. 7.

DETAILED DESCRIPTION OF THE PREFERRED EMBODIMENTS

Figure 1:
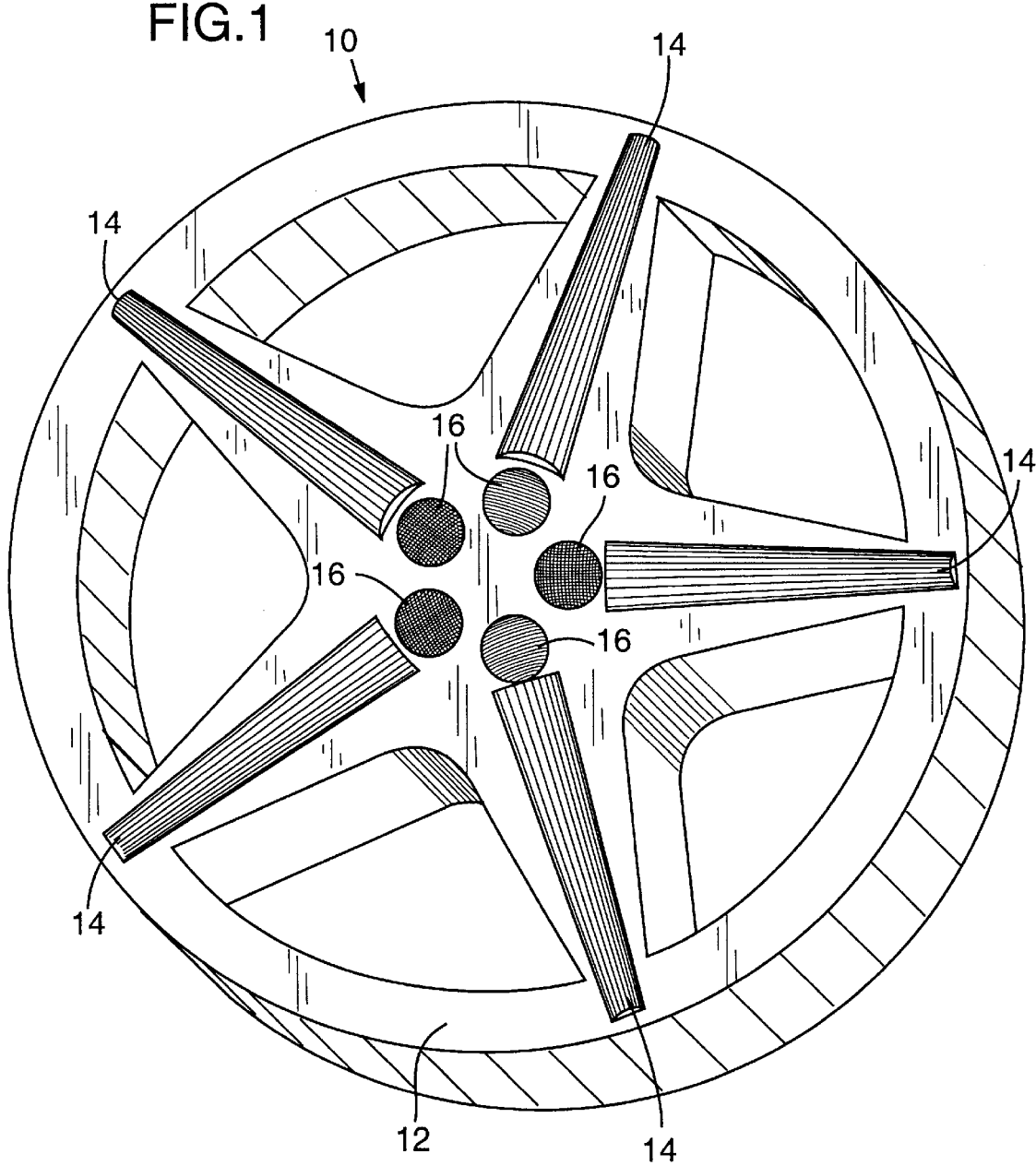
FIG. 1 is a perspective view of an exemplary embodiment of the invention.

FIG. 1 illustrates an exemplary embodiment of a wheel lighting system 10 of the present invention coupled to a wheel 12. The primary components of the wheel lighting system 10 include at least one reflective body 14 and at least one light source 16. Reflective body or bodies 14 and light source or sources 16 are suitably mounted to the wheel 12. A power source (not shown) is used to supply electricity to the light source 16. Light source 16 illuminates the reflective body 14 so that the reflective body 14 reflects light outward and onto the wheel 12. Each of these individual components of the wheel light system 10 is discussed in more detail below.

1. Reflective Bodies

Figure 2:
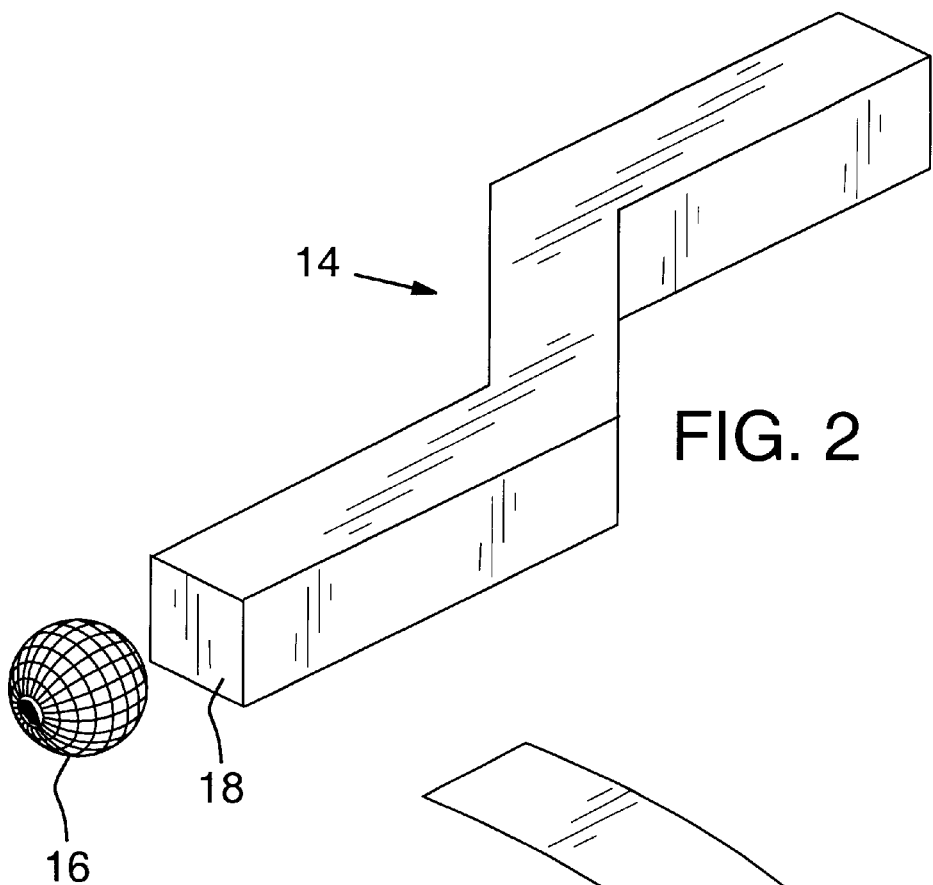
FIGS. 2–6 illustrate various configurations of the reflective body embodiment illustrated in FIG. 1.
Figure 3:
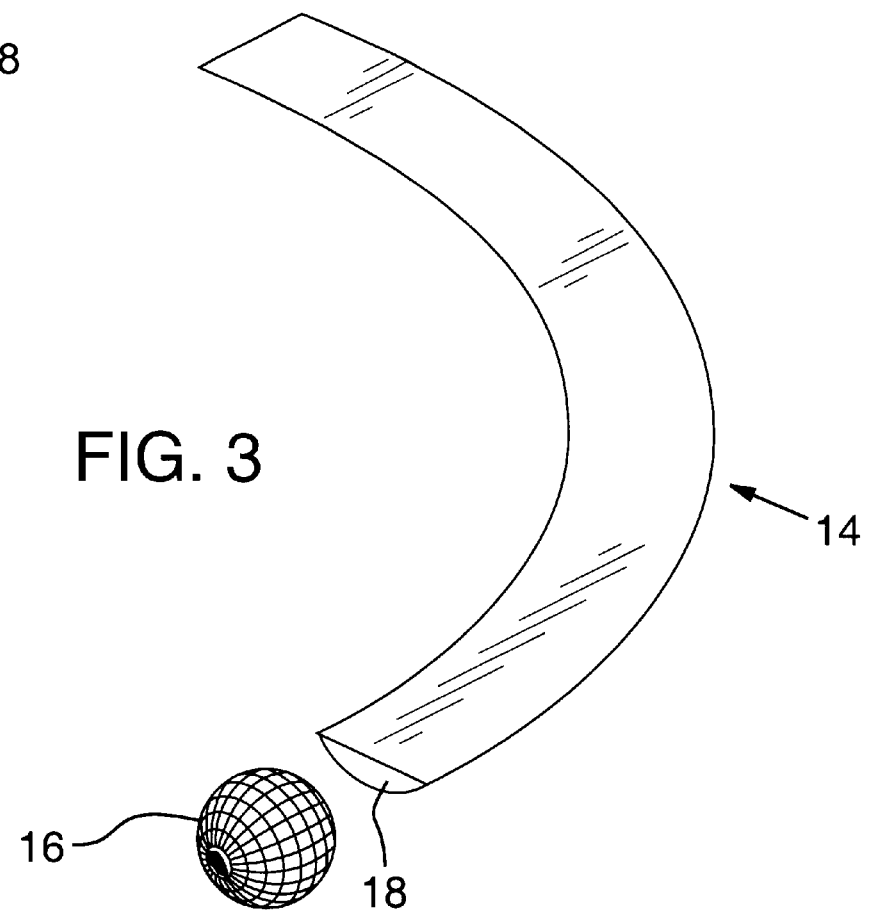
Figure 4:
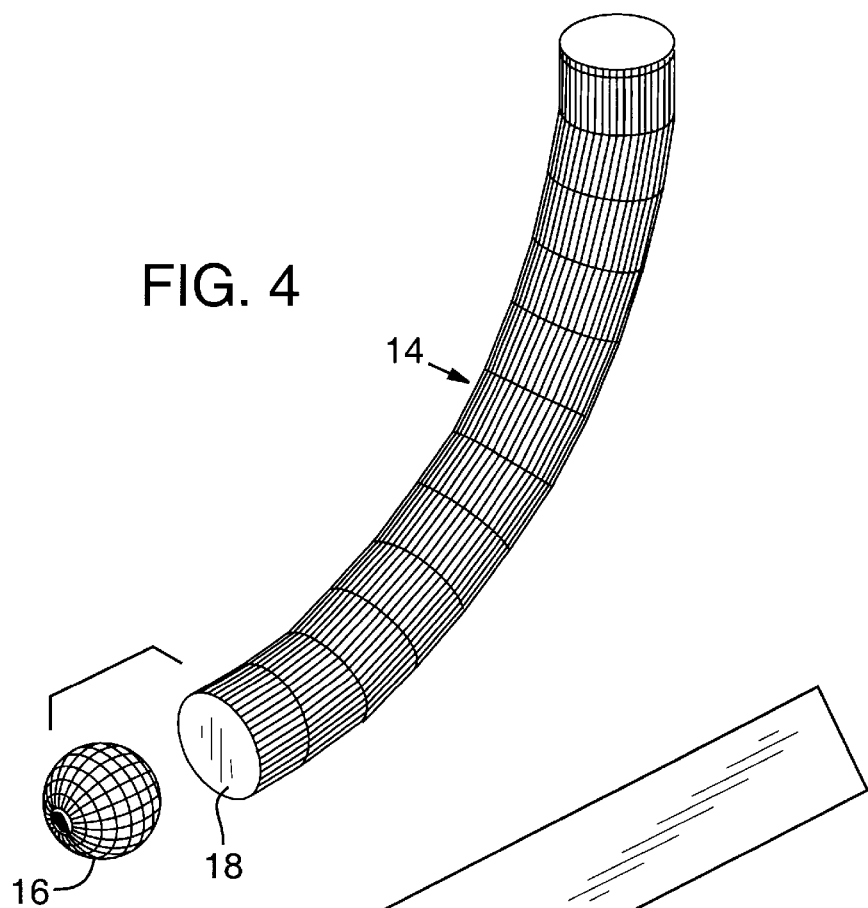

The reflective body 14 can have many different shapes and forms, with several representative examples being illustrated in FIGS. 1–6. It will be understood the term "reflective" body includes any transparent or translucent body that reflects and/or refracts light directed toward the body. The shape of the reflective body 14 can be linear, arched, curved, bent, beveled, bent in two or more places, arched in two or more places, etc. The shape of the reflective body 14 also can encompass any combination of the above mentioned shapes. FIG. 2 illustrates a bent reflective body 14 adjacent a light source 16. Light-receiving end 18 is positioned adjacent light source 16 for receiving light from the source 16. FIGS. 3 and 4 illustrate curved or arcuate reflective bodies 14 adjacent a light source 16. Light-receiving ends 18 of these bodies 14, as with the embodiment of FIG. 2, are positioned adjacent light source 16 for receiving light from the source 16.

Figure 5:
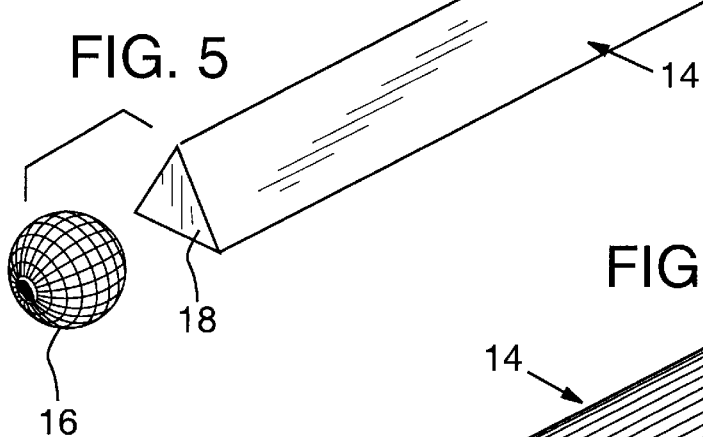
Figure 6:
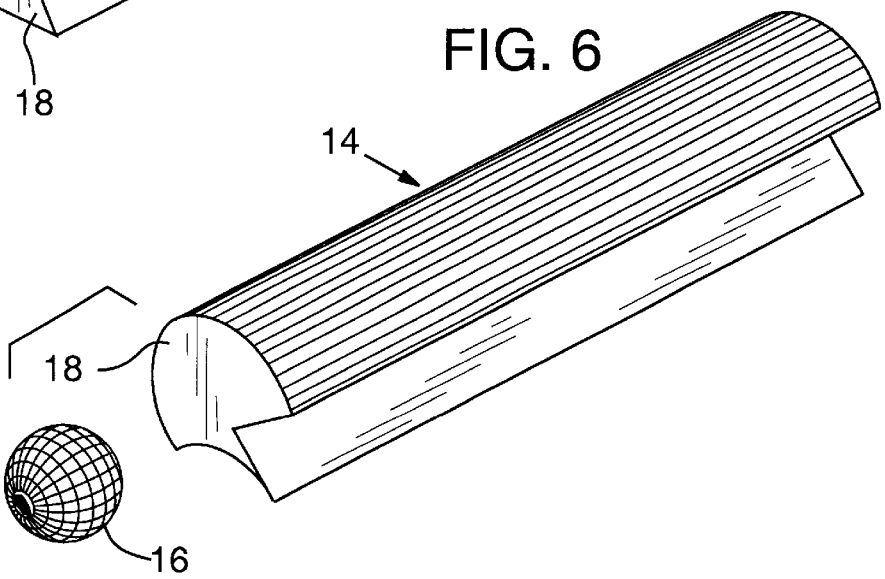

The cross-sectional shape of the reflective body 14 also can vary, and generally can be any geometric shape. Some examples of cross-sectional shapes used to form working embodiments of the reflective bodies 14 are illustrated in FIGS. 1–6 and include circles, triangles, squares and semi-circles. Other possible cross-sectional shapes include rectangles, polygons, arched, concave, convex, or any combination of these shapes. For example, FIG. 2 illustrates a reflective body 14 having a square cross section; FIG. 3 illustrates a reflective body 14 having, a semicircular cross section; FIG. 4 illustrates a reflective body 14 having a circular cross section; and FIG. 5 illustrates a reflective body 14 having a triangular cross section.

Reflective body 14 also can be tapered (both reduced and expanded), or evolve into other shapes throughout the length of the reflective body.

Reflective body 14 can be made from many materials, but there are some functional requirements for the selection of a suitable material for forming the body 14. For example, the reflective body should be able to transmit light along its length, should be attachable in some manner to a wheel, should be a good reflector and/or refractor of light, or should be capable of being converted into a light reflector, and should have adequate strength for desired applications. Currently, the preferred materials for forming reflective bodies 14 are polymeric materials, such as thermoplastic or thermoset materials. Examples, without limitation, of materials useful for forming reflective bodies 14 include acrylics, polycarbonates and polyvinyl carbonates (PVCs). Glass materials also can be used to form reflective bodies 14. As a result, particular materials for forming reflective bodies 14 may be selected from the group consisting of acrylics, polycarbonates, polyvinyl carbonates, glass, and mixtures thereof.

Furthermore, additives other than the materials listed above can be applied to the reflective body 14, or combined with the material or materials used to form the body 14, during or after the reflective body 14 is manufactured. Examples of such additives include, without limitation, sands, fluids, such as gases and particularly air, metallic particles, metallic-appearing particles, pigments, and mixtures thereof.

Reflective body 14 can be manufactured in a number of ways, and the preferred method for manufacturing a particular reflective 14 depends upon the design of the body 14. Examples, without limitation, of ways to manufacture reflective body 14 include injection molding, extrusion, extrusion post forming, casting, thermoforming, compression molding, and rotational casting. A currently preferred method for manufacturing reflective bodies 14 is by injection molding.

Reflective body 14 can be made to have a variety of textures, from smooth to rough. These textures can be applied to the reflective body 14 during the manufacturing process or formed on the body 14 during a subsequent production process. For example, at least one surface of the reflective body 14 can be textured using sand paper or a similar device. Reflective body 14 also may be textured by sandblasting.

The reflective body 14 (and more typically reflective bodies 14) is operably coupled to the wheel by any suitable means. For example, reflective body 14 can be coupled to a wheel 14 using a variety of attachment methods including adhesives, adhesive tapes, VELCRO, and mechanical fasteners, such as clips, screws, bolts, pressure fittings, etc.

2. Light Sources

Suitable light sources 16 include, but are not limited to, light-emitting diodes (LEDs) of any color, particularly blue, red, green, yellow, and orange, incandescent lights, flourescent lights, and lasers. LEDs currently are preferred for use as light sources 16.

Light source (or light sources) 16 are operably coupled to a power source. Light source 16 can be powered by a variety of different methods. For example, light source 16 can be a battery, or a series of batteries. The power source can be mounted to the wheel 12, or can be mounted on the vehicle.

The electrical connection to the wheel 12 can be provided by, amongst other things, slip rings, commutators with brushes, or equivalent devices. Examples of suitable power sources, other than battery power sources, are disclosed in issued patents, such as that disclosed in U.S. Pat. No. 5,530,630 (issued to Williams, Jr. on Jun. 25, 1996), incorporated herein by reference, and U.S. Pat. No. 3,767,909 (issued to Bell on Oct. 23, 1973), also incorporated herein by reference. Alternatively, the light source 16 can be powered by an electrical generator connected to the wheel 12, such as that disclosed in U.S. Pat. No. 3,548,185 (issued to Hall on Dec. 15, 1970), which is incorporated herein by reference.

3. Wheel-Spoke Embodiment

Figure 7:
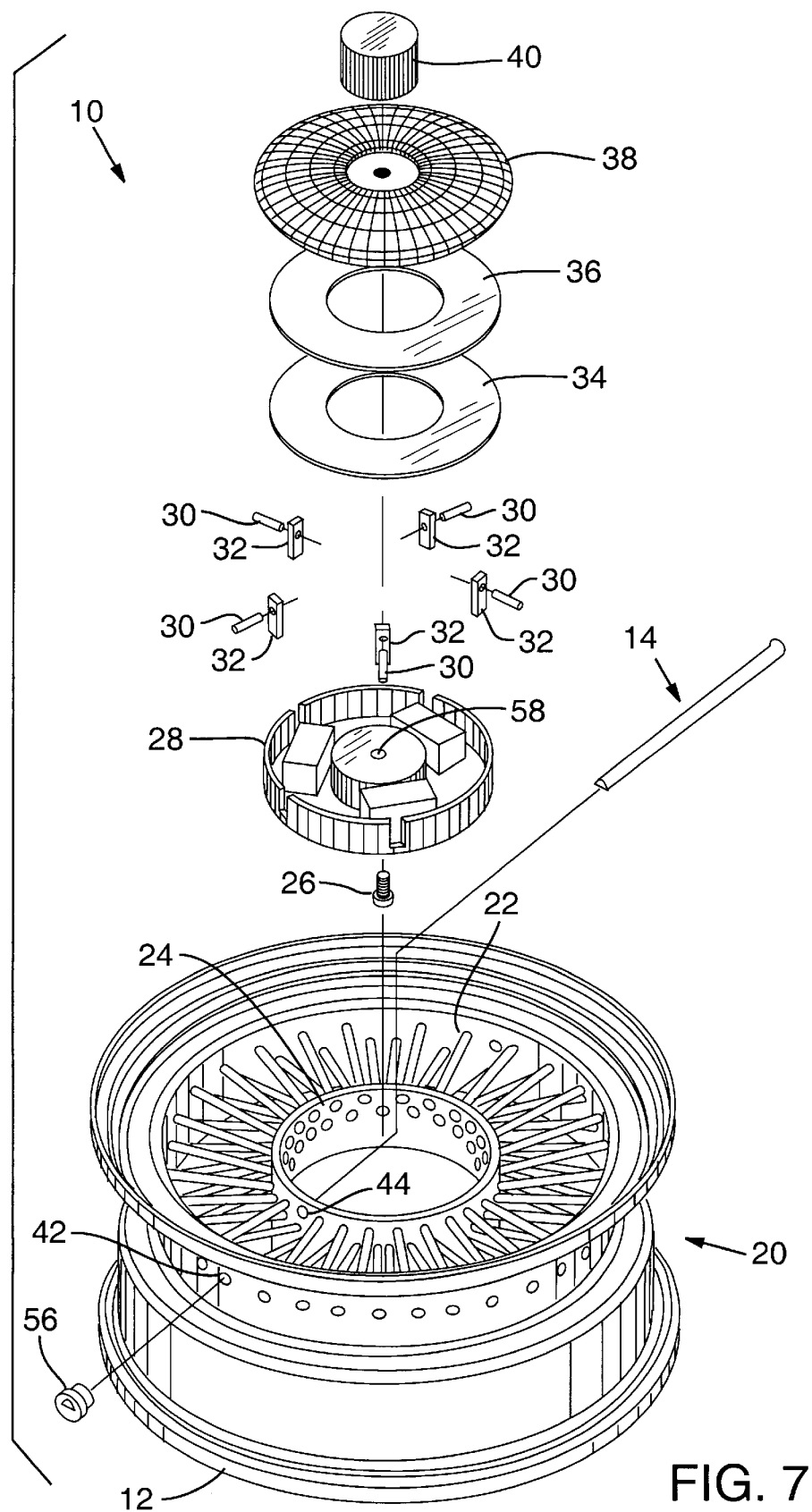
FIG. 7 is an exploded perspective view of a preferred embodiment of the invention.

An exploded perspective view of a currently preferred embodiment of the wheel lighting system 10 is illustrated in FIG. 7. The wheel lighting system 10 comprises an outer rim 20, a plurality of removable spokes 22, an inner hub 24, a main fastener 26, a main housing 28, light-emitting diodes (LEDs) 30, LED tabs 32, a circuit board 34, a cover 36, a center cap 38, and a spinner 40.

The removable spokes 22 are circumferentially placed around the inner hub 24, connecting the outer rim 20 to the inner hub 24, forming a spoked wheel 12, similar to a conventional spoked wheel. Several evenly spaced removable spokes 22 are removed and replaced with respective reflective bodies 14. Reflective bodies 14 are suitably sized and shaped for replacing the removable spokes 22. The number of spokes 22 replaced with reflective bodies 14 depends on the number of spokes 22 in the wheel 12; conventional spoked wheels typically include 60–100 spokes. Generally, 3–6 spokes 22 can be replaced with reflective bodies 14 without damaging the structural integrity of the spoked wheel 12; the greater the number of spokes 22 used to form wheel 12, the greater the number of spokes 22 that can be replaced with reflective bodies 14.

Replacement of the removable spokes 22 with reflective bodies 14 proceeds as follows with reference to FIGS. 7–9b. The removable spokes 22 are first removed at selected, evenly-spaced locations around the wheel 12. Removing spokes 22 exposes respective pairs of outer rim spoke holes 42 and inner hub spoke holes 44. As shown in FIGS. 8a and 8b, the reflective body 14 has a nose end 46 and an expanded end 48. The profile of the reflective body 14 comprises a flattened portion 50 so as to form a flattened surface 52 along the length of the reflective body 14. A reflective tape 54 can be applied to the surface 52 with an adhesive to enhance reflection of the reflective body 14. The nose end 46 of the reflective body 14 is respectively pulled through the inner hub spoke hole 44 and outer rim spoke hole 42 until the expanded end 48 is snug against the wheel 12. The reflective body 14 is then secured in position by slipping a cap 56 (FIGS. 9a–b) over the nose end 46 until the bottom of the cap 56 is against the wheel 12. Certain details of the cap 56 are illustrated in FIGS. 9a and 9b. The cap 56 is secured to the reflective body 14 by an adhesive, preferably an acrylic glue. Any extra length of the reflective body 14 that extends beyond the cap 56 is removed, such as by scoring and bending, or by using an appropriate cutting device. A sealant, such as a silicon sealant, is then applied to seal the outer rim hole 42.

A plan view of the main housing 28 is illustrated in FIG. 10. For a working embodiment of the invention that utilizes LEDs, including at least one blue LED, the main housing 28 houses three "C"-size batteries 58, connected in series. The LEDs 30 are received in respective LED tabs 32, which are situated in slots 60, each of which slot 60 is sized to receive and retain an LED 30. The output voltage of the batteries 58 is supplied to the LEDs 30 via a switch 62. The circuit board 34 fits in the main housing 28, and comprises a conventional remote control receiver that activates the switch 62 to turn the LED 30, or LEDs 30, on and off. Circuit board 34 is situated in the main housing 28 just above batteries 58, and is electrically connected to the switch 62 by a connector (not shown). The circuit board 34 is connected to the main housing 28 by suitable fasteners, such as screws. The cover 36 is situated over the circuit board 34 in the main housing 28, and preferably is secured to the housing 28 by a suitable adhesive. The center cap 38 is then placed over the cover 36 in the main housing 28. With reference to FIGS. 7 and 10, the main fastener 26 is inserted through a hole 58 in the main housing 28, whereupon the spinner 40, which contains an internal thread (not shown) is threaded onto the main fastener 26 to secure the assembled components. The external configuration of the main housing 28 is sized to snugly fit into the inner hub 24.

The main housing 28 illustrated in FIG. 10 includes 5 LEDs 30, corresponding to a spoked wheel 12 having 5 spokes 22 replaced with 5 reflective bodies 14. The LEDs 30 preferably are situated so that they direct light toward the nose end 46 of respective reflective bodies 14. The placement and number of LEDs 30 can vary to correspond to the location and number of removable spokes 22 replaced by reflective bodies 14 for a particular spoked wheel 12.

The present invention provides many improvements over the prior art, including:
(a) providing a light system for wheels that accentuates the wheel.
(b) providing a light system for wheels that optimizes the emitted light by making more of the light visible with less intensity.
(c) providing a light system for wheels that is adaptable to many different wheel designs.
(d) providing a light system for wheels that can be modified to allow for different lighting effects on the same wheel.

The present invention also satisfies a need for individuality and creativeness in the market. Because the lighting system 10 can be easily modified, i.e. changing reflective bodies 14, changing color of the light source 16, etc., the look of the wheel 12 can be altered without expensive tooling. This allows wheel manufactures to provide many different wheel designs at lower production costs, passing on the savings to consumers. The lighting system 10 offers consumers an opportunity to make their automobiles unique and individualized without excessive cost.

While the present invention has been described in connection with preferred embodiments, it will be understood that the invention is not limited to those embodiments. On the contrary, the invention is intended to cover all alternatives, modifications, and equivalents as may be included within the spirit and scope of the invention as defined in the following claims.

I claim:
1. A light system for a vehicle wheel, comprising:
at least one light source for mounting proximate the center of the wheel;
plural, reflective bodies extending radially with respect to the wheel and, each having a light-receiving end disposed adjacent the center of the wheel and coupled to the at least one light source; and
an electric power source electrically connected to the at least one light source, the at least one light source directing light toward the light-receiving ends of the reflective bodies and through the reflective bodies to illuminate the reflective bodies.

2. The light system of claim 1 wherein the at least one light source and reflective bodies are attached to the wheel.

3. The light system of claim 1 wherein the light source comprises a plurality of lights.

4. The light system of claim 3 wherein at least one of the lights is a light-emitting diode.

5. The light system of claim 1 wherein the light source comprises a plurality of lights, each light directing light toward the light-receiving end of a respective reflective body.

6. The light system of claim 5 wherein the plurality of lights are light-emitting diodes.

7. The light system of claim 1, wherein the plural reflective bodies are made from a polymeric material.

8. The light system of claim 1, wherein the plural reflective bodies are glass.

9. The light system of claim 1, wherein the plural reflective bodies have cross-section profiles comprising flattened portions so as to form flattened surfaces along length portions of the reflective body.

10. The light system of claim 1, wherein the electrical power source comprises at least one battery.

11. The light system of claim 1 wherein a reflective body is a wheel spoke.

12. A light system for a vehicle wheel, comprising:
   at least one light source;
   plural reflective bodies operatively coupled to the at least one light source wherein the plural reflective bodies have cross-section profiles comprising flattened portions so as to form flattened surfaces along length portions of the reflective body and wherein a reflective tape is applied to the outside of a reflective body along the flattened surface; and
   an electric power source electrically connected to the at least one light source which directs light toward the reflective bodies to illuminate the reflective bodies.

13. A light system for a vehicle wheel, comprising:
   a spoked wheel having an inner hub and an outer rim, the inner hub connected to the outer rim by a plurality of removable spokes;
   a light source;
   at least one reflective body, the at least one reflective body being sized and shaped for replacing a removable spoke;
   an electrical source electrically connected to the light source, wherein at least one of the removable spokes is removed and replaced with at least one respective reflective body, a first light receiving end of the at least one reflective body extending through the inner hub, a second cap end extending through the outer rim, the light source directing light toward the light-receiving end of the at least one reflective body, the light being reflected from within the at least one reflective body so as to illuminate the at least one reflective body.

14. The light system of claim 13 comprising a plurality of reflective bodies and wherein the light source comprises a plurality of lights circumferentially mounted in the wheel hub so as to direct light toward respective reflective bodies.

15. The lighted wheel of claim 14 wherein the lights are light-emitting didoes.

16. The lighted wheel of claim 13 wherein the electrical source is at least one battery mounted in the inner hub.

17. A light system for a vehicle wheel, comprising:
   a light source;
   at least one elongated reflective body operatively coupled to the light source, the reflective body having a cross-section profile comprising a flattened portion so as to form a flattened surface along a length portion of the reflective body;
   a reflective tape applied to the outside of the reflective body along the flattened surface; and
   an electric power source electrically connected to the light source, the light source directing light toward the reflective body to illuminate the reflective body.

* * * * *